United States Patent
Yoshihara

(10) Patent No.: US 8,676,200 B2
(45) Date of Patent: Mar. 18, 2014

(54) MOBILE COMMUNICATION SYSTEM, BASE STATION DEVICE, MOBILE STATION DEVICE, AND HANDOVER METHOD

(75) Inventor: Akio Yoshihara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/322,387

(22) PCT Filed: May 27, 2010

(86) PCT No.: PCT/JP2010/003570
§ 371 (c)(1),
(2), (4) Date: Nov. 23, 2011

(87) PCT Pub. No.: WO2010/137331
PCT Pub. Date: Dec. 2, 2010

(65) Prior Publication Data
US 2012/0077499 A1  Mar. 29, 2012

(30) Foreign Application Priority Data
May 27, 2009 (JP) ............... P2009-127893

(51) Int. Cl.
*H04W 36/26* (2009.01)
*H04W 4/00* (2009.01)

(52) U.S. Cl.
USPC ..... 455/435.2; 455/434; 455/436; 455/456.2; 370/328

(58) Field of Classification Search
USPC ............ 455/435.2, 434, 411, 436, 456.2; 370/328
See application file for complete search history.

(56) References Cited

U.S. PATENT DOCUMENTS

| | | | |
|---|---|---|---|
| 2009/0137249 A1* | 5/2009 | Horn et al. | 455/435.2 |
| 2009/0270092 A1* | 10/2009 | Buckley et al. | 455/434 |
| 2010/0227627 A1* | 9/2010 | Ishii et al. | 455/456.2 |
| 2010/0238858 A1* | 9/2010 | Kim et al. | 370/328 |
| 2011/0269468 A1* | 11/2011 | Sundell et al. | 455/436 |
| 2012/0087264 A1* | 4/2012 | Lindoff et al. | 370/252 |

FOREIGN PATENT DOCUMENTS

| | | |
|---|---|---|
| CN | 101287294 A | 10/2008 |
| WO | WO 2009/028209 A1 | 3/2009 |

OTHER PUBLICATIONS

"LS on CSG requirements for UTRA/E-UTRA", 3GPP TSG-SA WG1 meeting #40, Budapest, Hungary, May 12-16, 2008, 3GPP TSGA WG2 meeting #61bis Mar. 31-Apr. 4, 2008 Shenzhen, China.
"Reply LS on CSG requirements for UTRA/E-UTRA", 3GPP TSG-SA WG1 meeting #40, Budapest, Hungary, May 12-16, 2008.

(Continued)

*Primary Examiner* — Jinsong Hu
*Assistant Examiner* — Jean Chang
(74) *Attorney, Agent, or Firm* — Birch, Stewart, Kolasch & Birch, LLP

(57) ABSTRACT

A mobile communication system includes: a mobile station device; a first base station device to which an accessible time is set; and a second base station device. If the mobile communication system detects that a time according to the accessible time elapses and if the mobile station device is in communication with the first base station device, the mobile communication system performs a handover to switch a communication connection between the mobile station device and the first base station device to a communication connection between the mobile station device and the second communication device. Accordingly, disconnection of a call is prevented from occurring if the communication device is in communication with the first base station device when the accessible time expires.

11 Claims, 10 Drawing Sheets

(56) References Cited

OTHER PUBLICATIONS

3GPP TR 23.830 "3rd Generation Partnership Project; Technical Specification Group Services and System Aspects; Architecture aspects of home NodeB and Home eNodeB (Release 9)", v0.3.0, Feb. 2009, pp. 30-31.

3GPP TS 22.011 "3rd Generation Partnership Project; Technical Specification Group Services and System Aspects; Service accessibility (Release 1999)", v3.5.0, Jun. 2001, pp. 1-15.

International Search Report for PCT/JP2010/003570 dated Aug. 31, 2010.

* cited by examiner

US 8,676,200 B2

MOBILE COMMUNICATION SYSTEM, BASE STATION DEVICE, MOBILE STATION DEVICE, AND HANDOVER METHOD

TECHNICAL FIELD

The present invention relates to a mobile communication system, a base station device, a mobile station device, and a handover method.

Priority is claimed on Japanese Patent Application No. 2009-127893, filed May 27, 2009, the content of which is incorporated herein by reference.

BACKGROUND ART

Regarding W-CDMA (Wideband Code Division Multiple Access), LTE (Long Term Evolution), and LTE-A (LTE-Advance) which are standards for mobile communication, it has been considered to introduce a small radio base station Home (e)Node B for the purposes of expansion of service areas, individual use, and the like. Regarding the Home (e)NB, a UE (User Equipment) which is allowed to access the base station can be limited. The base station subjected to the limitation is referred to as a CSG (Closed Subscriber Group). The standardization of this CSG has been in process by 3GPP (3rd Generation Partnership Project).

Hereinafter, the 3GPP standard regarding the CSG is explained.

An owner or operator of the CSG can freely set the allowance or forbiddance of access to the CSG for each mobile station device. Additionally, the owner or operator can set a period of time for which the mobile station device is allowed to access the CSG (hereinafter, accessible time). The accessible time is managed on the network side, and is not reported to the mobile station device (see Non-Patent Document 2). After the accessible time expires, the mobile station device is not allowed to camp on the CSG cell. Further, it is defined by the standard of the 3GPP Rel-8 that if communication is in process when the accessible time expires, the communication call is forced to be disconnected (see Non-Patent Document 1 and 3).

If information concerning the allowance or forbiddance of access to the CSG is changed, the changed information is reported to the mobile station device. Based on the reported information, an allowed CSG list stored by the mobile station device is updated. However, the detailed procedure of updating the allowed CSG list has not yet been defined by the 3GPP.

Whether to allow or forbid access to the CSG is determined when the mobile station device detects a CSG cell, based on the following three steps.

Step 1: The mobile station device obtains CSG identification information (CSG identity) reported by system information of the CSG cell.

Step 2: The mobile station device confirms whether or not the received CSG identification information is included in the allowed CSG list stored by the mobile station device.

Step 3: If the allowed CSG list is included, the mobile station device determines that access to the CSG cell is allowed. If the allowed CSG list is not included, the mobile station device determines that access to the CSG cell is not allowed.

CITATION LIST

Non-Patent Document

[Non-Patent Document 1] 3GPP TS 22.011: "Service accessibility"

[Non-Patent Document 2] 3GPP S1-080531 "LS on CSG requirements for UTRA/E-UTRA" (3GPP SA1#40)

[Non-Patent Document 3] 3GPP S1-080661 "Reply LS on CSG requirements for UTRA/E-UTRA" (3GPP SA1#40)

DISCLOSURE OF THE INVENTION

Problems to be Solved by the Invention

However, in the mobile communication system using the base station device to which the accessible time is set, such as the aforementioned CSG if a mobile station device is in communication with the base station device to which the accessible time is set, there is a problem in that the call is disconnected, which is unexpected for the user.

The present invention has been made in view of the above situations. An object of the present invention is to provide a mobile communication system, a base station device, a mobile station device, and a handover method for preventing disconnection of a call occurring if the mobile station device is in communication with the base station device to which the accessible time is set.

Means for Solving the Problems (1) The present invention has been made to solve the above problems. A mobile communication system of the present invention includes: a mobile station device; a first base station device to which an accessible time is set; and a second base station device. One of the mobile station device and the first base station device includes: a time detector configured to detect that a time according to the accessible time elapses from the time the mobile station device performs position registration to the first base station device. If the time detector detects that the time according to the accessible time elapses and if the mobile station device is in communication with the first base station device, the mobile communication system performs a handover to switch a communication connection between the mobile station device and the first base station device to a communication connection between the mobile station device and the second communication device.

(2) Regarding the above mobile communication system according to the present invention, the first base station device further includes: an accessible time notifier configured to report the accessible time to the mobile station device when the position registration of the first mobile station device is performed, and the mobile station device includes the time detector.

(3) Regarding the above mobile communication system according to the present invention, the mobile station device includes: a handover request notifier configured to report a handover request to the first base station device if the time detector detects that the time according to the accessible time elapses and if the mobile station device is in communication with the first base station device.

(4) Regarding the above mobile communication system according to the present invention, the mobile station device includes: a reception level measuring unit configured to measure reception levels of signals transmitted from respective base station devices including the first base station device and the second base station device; and a measurement result reporting unit configured to report, to the first base station device, information indicating the reception levels measured by the reception level measuring unit. The measurement result reporting unit is configured to report to the first base station device, based on detection performed by the time detector, information indicating that the time according to the accessible time elapses.

(5) Regarding the above mobile communication system according to the present invention, the mobile station device includes: a reception level measuring unit configured to measure reception levels of signals transmitted from respective base station devices including the first base station device and the second base station device; and a measurement result reporting unit configured to report, to the first base station device, information indicating the reception levels measured by the reception level measuring unit. The measurement result reporting unit is configured to add a negative offset to one of the reception levels which is associated with the first base station device and to report the information, if the time detector detects that the time according to the accessible time elapses.

(6) Regarding the above mobile communication system according to the present invention, the first base station device includes the time detector.

(7) Additionally, a base station device of the present invention is configured to communicate with a mobile station device. The mobile station device is configured to detect that a time according to an accessible time elapses. The accessible time is set to the base station device. The base station device includes: an accessible time notifier configured to report the accessible time to the mobile station device when position registration of the mobile station device is performed. If the time detector detects that the time according to the accessible time elapses and if the mobile station device is in communication with the first base station device, the base station device performs a handover to switch a communication connection between the mobile station device and the base station device to a communication connection between the mobile station device and another communication device.

(8) Additionally, a base station device of the present invention is configured to communicate with a mobile station device. An accessible time is set to the base station device. The base station device includes: a time detector configured to detect that a time according to the accessible time elapses from the time the mobile station device performs position registration to the base station device. If the time detector detects that the time according to the accessible time elapses and if the mobile station device is in communication with the base station device, the base station device performs a handover to switch a communication connection between the mobile station device and the base station device to a communication connection between the mobile station device and another communication device.

(9) Additionally, a mobile station device of the present invention is configured to communicate with a base station device. An accessible time is set to the base station device. The base station device is configured to report the accessible time when position registration of the mobile station device is performed. The mobile station device includes: a time detector configured to detect that a time according to the accessible time elapses from the time the mobile station device performs the position registration to the base station device. If the time detector detects that the time according to the accessible time elapses and if the mobile station device is in communication with the base station device, the mobile station device performs a handover to switch a communication connection between the mobile station device and the base station device to a communication connection between the mobile station device and another communication device.

(10) Additionally, a mobile station device of the present invention is configured to communicate with a base station device to which an accessible time is set. The base station device includes a time detector configured to detect that a time according to the accessible time elapses from the time the mobile station device performs position registration to the first base station device. If the time detector detects that the time according to the accessible time elapses and if the mobile station device is in communication with the first base station device, the mobile station device performs a handover to switch a communication connection between the mobile station device and the first base station device to a communication connection between the mobile station device and the second communication device.

(11) Additionally, a handover method of the present invention is a handover method for a mobile communication system including: a mobile station device; a first base station device to which an accessible time is set; and a second base station device. The handover method includes: a first step of one of the mobile station device and the first base station device detecting that a time according to the accessible time elapses from the time the mobile station device performs position registration to the first base station device; and a second step of performing a handover to switch a communication connection between the mobile station device and the first base station device to a communication connection between the mobile station device and the second communication device, if the time detector detects that the time according to the accessible time elapses and if the mobile station device is in communication with the first base station device.

Effects of the Invention

According to the present invention, if the time detector detects a time associated with the accessible time has elapsed, and if the mobile station device is in communication with the first base station device, a handover is performed to switch the communication connection between the mobile station device and the first base station device to communication connection between the mobile station device and the second base station device. Accordingly, disconnection of a call, which occurs if the mobile station device is in communication with the first base station device when the accessible time expires, can be prevented.

BEST MODE FOR CARRYING OUT THE INVENTION

First Embodiment

Figure 1:
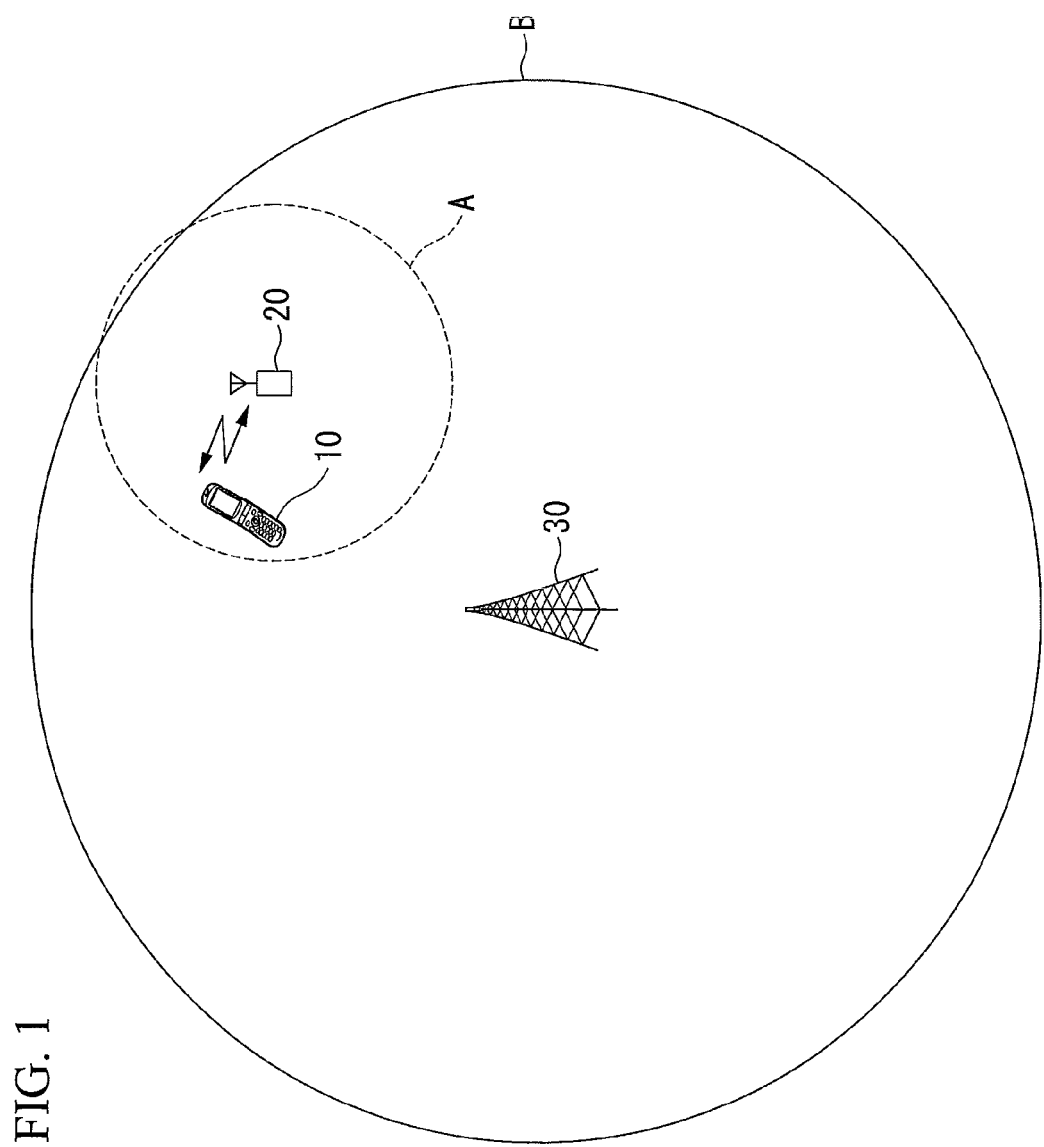
FIG. 1 is a conceptual diagram illustrating a configuration of a mobile communication system 100 according to a first embodiment of the present invention.

Hereinafter, a first embodiment of the present invention is explained with reference to the drawings. FIG. 1 is a conceptual diagram illustrating a configuration of a mobile communication system 100 according to an embodiment of the present invention. The mobile communication system 100 of the first embodiment includes: a base station device (second base station device) 30; a base station device 20 for a specific subscriber (first base station device) installed in a cell B served by the base station device 30; and a mobile station device 10 camping on a cell A served by the base station device 20 for the specific subscriber. In the first embodiment, the cell B served by the base station device 30 overlaps the cell A served by the base station device 20 for the specific subscriber. The mobile station device 10 is present in the overlapping region.

The base station device 20 for the specific subscriber is the closed subscriber group, the standardization of which has been in process by the 3GPP. Only a specific registered subscriber can access the base station device 20 for the specific subscriber. Additionally, an accessible time τ is set to the base station device 20 for the specific subscriber. If the predetermined accessible time τ elapses after the position of the mobile station device 10 is registered to the base station device 20 for the specific subscriber, even the mobile station device 10 of the specific subscriber, which is set as the mobile station device allowed to access the base station device 20 for the specific subscriber, is forbidden to access the base station device 20 for the specific subscriber. Further, if the mobile station device 10 is in communication with the base station device 20 for the specific subscriber when the predetermined accessible time τ elapses, the base station device 20 for the specific subscriber forcibly disconnects the communication.

Figure 2:
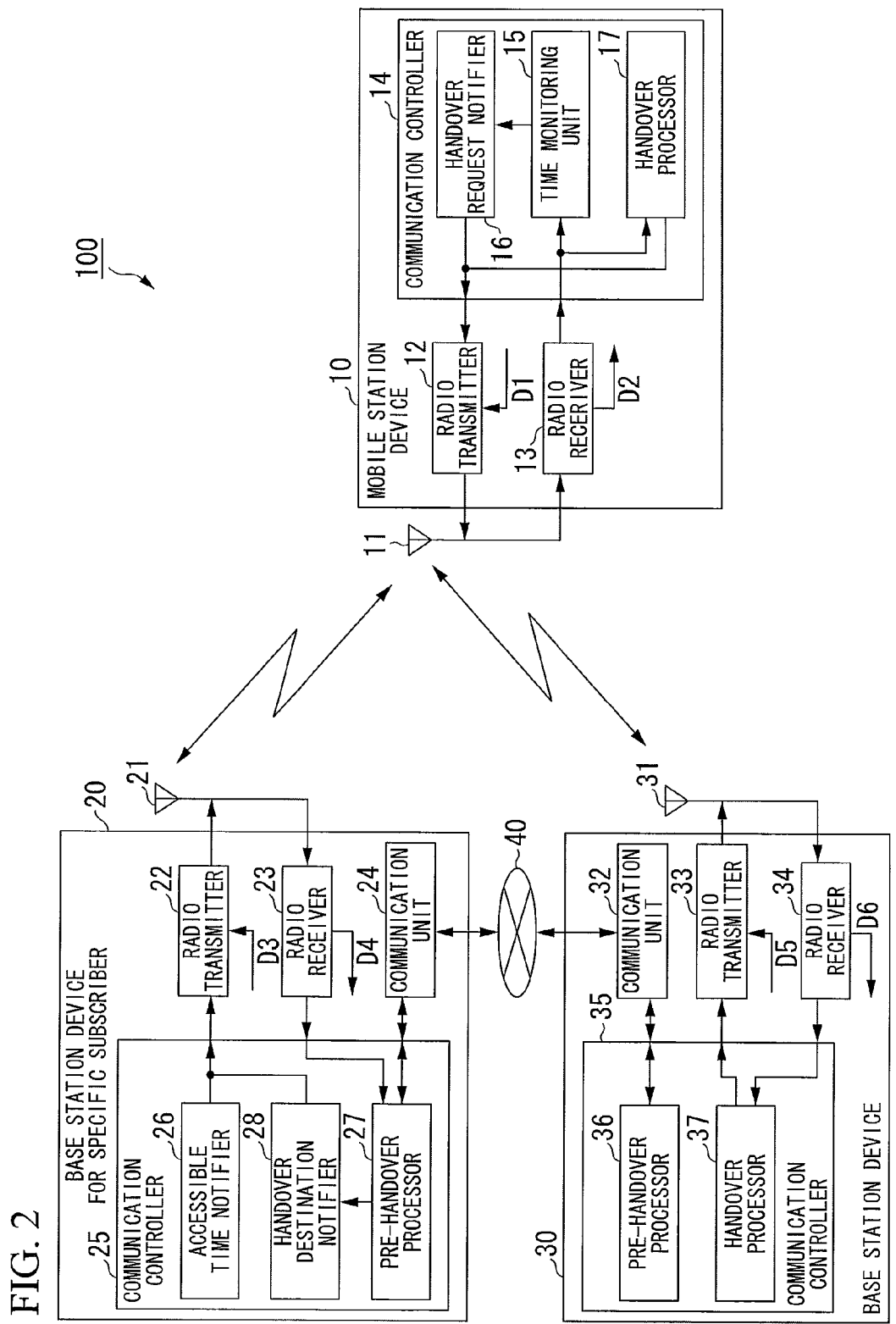
FIG. 2 is a schematic block diagram illustrating a configuration of the mobile communication system 100 according to the first embodiment.

FIG. 2 is a schematic block diagram illustrating a configuration of the mobile communication system 100 according to the first embodiment. As shown in FIG. 2, the mobile communication system 100 includes: the mobile station device 10; the base station device 20 for the specific subscriber; and the base station device 30. The mobile station device 10 includes: an antenna 11; a radio transmitter 12; a radio receiver 13; and a communication controller 14. The communication controller 14 includes: a time monitoring unit 15; a handover request notifier 16; and a handover processor 17.

The base station device 20 for the specific subscriber includes: an antenna 21; a radio transmitter 22; a radio receiver 23; a communication unit 24; and a communication controller 25. The communication controller 25 includes: an accessible time notifier 26; a pre-handover processor 27; and a handover destination notifier 28. The base station device 30 includes: an antenna 31; a communication unit 32; a radio transmitter 33; a radio receiver 34; and a communication controller 35. The communication controller 35 includes: a pre-handover processor 36; and a handover processor 37.

Additionally, the communication unit 24 of the base station device 20 for the specific subscriber and the communication unit 32 of the base station device 30 are connected through a network 40. The network 40 includes, but is not limited to, a network, such as the Internet or a core network of the mobile communication system 100. Explanations are given here under the assumption that the base station device 20 for the specific subscriber communicates with the base station device 30 through the network 40. However, the configuration is not limited thereto. For example, the base station device 20 for the specific subscriber may wirelessly communicate with the base station device 30 through the respective antennas 21 and 31.

Regarding the mobile station device 10, the antenna 11 is an antenna for wireless communication with the base station device 20 for the specific subscriber and the base station device 30. Under control of the communication controller 14, the radio transmitter 12 modulates and upconverts control data D1 and control data from the communication controller 14. Then, the radio transmitter 12 wirelessly transmits the control data to the base station device 20 for the specific subscriber or the base station device 30 through the antenna 11. The radio receiver 13 receives, through the antenna 11, a signal transmitted from the base station device 20 for the specific subscriber or the base station device 30. Then, the radio receiver 13 downconverts and demodulates the received signal to obtain communication data D2 and control data. Then, the radio receiver 13 outputs the obtained control data to the communication controller 14. The communication controller 14 and the constituent elements thereof communicate with the base station device 20 for the specific subscriber or the base station device 30 through the radio transmitter 12 or the radio receiver 13. However, descriptions thereof are omitted here.

The communication controller 14 controls the radio transmitter 12 and the radio receiver 13. For example, the communication controller 14 detects that a time according to the accessible time elapses. At this time, if the mobile station device 10 is in communication with the base station device 20 for the specific subscriber, the communication controller 14 performs a handover that switches communication connection between the mobile station device 10 and the base station device 20 for the specific subscriber to communication connection between the mobile station device 10 and the base station device 30. The details of the communication controller 14 will be explained later.

The time monitoring unit 15 includes a timer. When the position of the mobile station device 10 is registered to the base station device 20 for the specific subscribe, the time monitoring unit 15 sets to the timer, a time according to the accessible time τ that is received from the base station device 20 for the specific subscriber. When the timer expires, the time monitoring unit 15 detects that the time according to the accessible time τ elapses from the time the position of the mobile station device 10 is registered to the base station device 20 for the specific subscriber. Here, the time according to the accessible time τ is, for example, a value obtained by subtracting a predetermined value from the accessible time τ, or a value obtained by multiplying the accessible time τ by a predetermined value that is between 0 and 1. In the first embodiment, a value obtained by subtracting a time sufficient for performing a handover from the accessible time τ is used as the time according to the accessible time τ, as will be explained later.

The handover request notifier 16 detects that the time according to the accessible time τ elapses. At this time, if the mobile station device is in communication with the base station device 20 for the specific subscriber, the handover request notifier 16 reports a handover request to the base station device 20 for the specific subscriber.

The handover processor 17 performs a process of handover to the base station device 30 upon receiving the handover instruction transmitted as control data from the base station device 20 for the specific subscriber. The handover processor 17 reports completion of the handover to the base station device 30 at the end of the handover process. The procedure for the handover process is out of the scope of the present invention, and therefore detailed explanations thereof are omitted here. Here, a known procedure may be used as the procedure for the handover process.

Regarding the base station device 20 for the specific subscriber, the antenna 21 is an antenna for wireless communication with the mobile station device 10. The radio transmitter 22 modulates and upconverts control data D3 and control data from the communication controller 25 under control of the communication controller 25. Then, the radio transmitter 22 wirelessly transmits the control data to the mobile station device 10 through the antenna 21. The radio receiver 23 receives, through the antenna 21, a signal transmitted from the mobile station device 10. Then, the radio receiver 23 downconverts and demodulates the received signal to obtain communication data D4 and control data. Then, the radio receiver 13 outputs the obtained control data to the communication controller 25. The communication unit 24 communicates with the base station device 30 through the network 40. The communication controller 25 and the constituent elements thereof communicate with the mobile station device 10 through the radio transmitter 22 or the radio receiver 23. However, descriptions thereof are omitted here. The communication controller 25 and the constituent elements thereof communicate with the base station device 30 through the communication unit 24. However, descriptions thereof are omitted here.

The communication controller 25 controls the radio transmitter 22, the radio receiver 23, and the communication unit 24. For example, the communication unit 25 stores identification information of the specific registered subscriber. The communication unit 25 checks identification information of the accessing mobile station device 10 against the stored identification information. If these identification information pieces match, the communication controller 25 allows the access. The details of the communication controller 25 will be explained later.

The accessible time notifier 26 reports the previously-set accessible time τ to the mobile station device 10 when the position registration of the mobile station device 10 is performed.

Upon receiving the handover request from the mobile station device 10, the pre-handover processor 27 communicates with the base station device 30 through the communication unit 24 and the network 40, and performs a pre-handover process between the base station device 20 for the specific subscriber and the base station device 30. The pre-handover process is a process of communicating with the base station device 30 installed around the base station device 20 for the specific subscriber, selecting a base station device 30 accessible to the mobile station device 10, and outputting information for identifying the selected base station device 30 to the handover destination notifier 28. The handover destination notifier 28 reports, to the mobile station device 10, a handover instruction including the information for identifying the base station device 30, which is received from the pre-handover processor 27.

Regarding the base station device 30, the antenna 31 is an antenna for wireless communication with the mobile station device 10. The communication unit 32 communicates with the base station device 20 for the specific subscriber through the network 40. Under control of the communication controller 35, the radio transmitter 33 modulates and upconverts control data D5 and control data from the communication controller 35. Then, the radio transmitter 33 wirelessly transmits the control data to the mobile station device 10 through the antenna 31. The radio receiver 34 receives, through the antenna 31, a signal transmitted from the mobile station device 10. Then, the radio receiver 34 downconverts and demodulates the received signal to obtain communication data D6 and control data. Then, the radio receiver 34 outputs the obtained control data to the communication controller 35.

The communication controller 35 controls the communication unit 32, the radio transmitter 33, and the radio receiver 34. The communication controller 35 and the constituent elements thereof communicate with the mobile station device 10 through the radio transmitter 33 or the radio receiver 34. However, descriptions thereof are omitted here. Additionally, the communication controller 35 and the constituent elements thereof communicate with the base station device 20 for the specific subscriber through the communication unit 32. However, descriptions thereof are omitted here.

The pre-handover processor 36 communicates with the base station device 20 for the specific subscriber and performs a per-handover process between the base station device 30 and the base station device 20 for the specific subscriber. The handover processor 37 performs a handover process of communicating with the mobile station device 10 and causing the mobile station device 10 in communication with the base station device 20 for the specific subscriber to communicate with the base station device 30.

Figure 3:
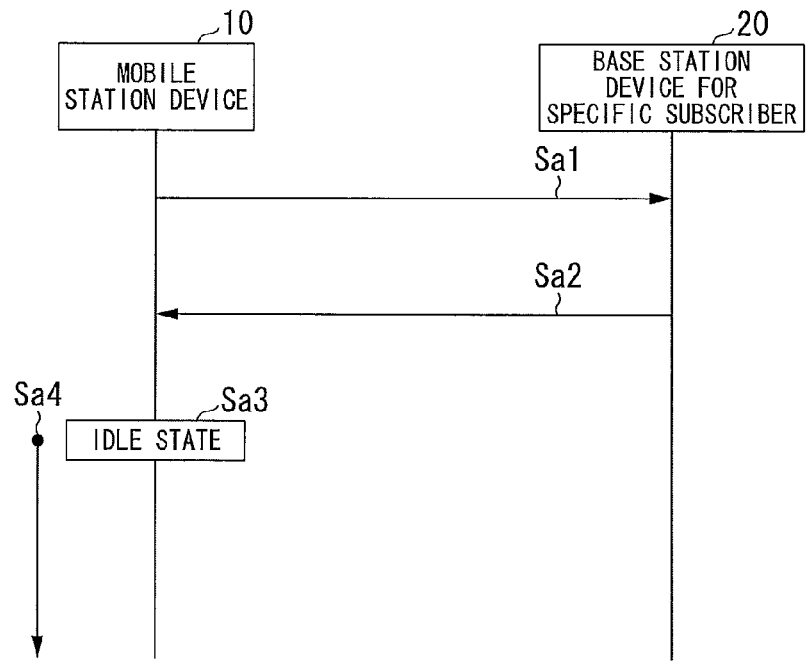
FIG. 3 is a sequence chart illustrating operations at the time of position registration according to the first embodiment.

FIG. 3 is a sequence chart illustrating operations at the time of the position registration according to the first embodiment. The mobile station device 10 initiates a position registration process upon receiving a signal transmitted from the base station device 20 for the specific subscriber to which the mobile station device 10 is allowed to access. The position registration process is initiated by the communication controller 14 of the mobile station device 10 transmitting, to the base station device 20 for the specific subscriber, a position registration request (such as a location update request, a routing area update request, or a tracking area update request in the case of W-CDMA) (Sa1).

Additionally, the communication controller 14 determines whether or not access to the base station device 20 for the specific subscriber from which the signal is received is allowed, based on whether or not the identification information of the base station device 20 for the specific subscriber, which is obtained from the received signal, is registered to an access allowed CSG list. The access allowed CSG list is stored by the communication controller 14, and is a list of identification information of the base station device 20 for the specific subscriber to which the mobile station device 10 is allowed to access. The mobile station device 10 includes a detachable module, such as an SIM card (Subscriber Identity Module Card), which includes a rewritable memory, such as a flash memory. The access allowed CSG list may be stored in the memory of the module. If the module is a module for specifying a subscriber, such as the SIM card, the access allowed CSG list stored in the memory of the module may be a list of identification information of the base station device 20 for the specific subscriber to which the subscriber specified by the module is allowed to access.

Upon receiving the aforementioned position registration request, the communication controller 25 of the base station device 20 for the specific subscriber performs position registration of the mobile station device 10. Additionally, the accessible time notifier 26 of the communication controller 25 reports, to the mobile station device 10, position registration acknowledgment including the previously-set accessible time τ (Sa2). As the position registration acknowledgement, for example, location update accept, routing area update accept, tracking area update accept, or the like in the case of the W-CDMA are used.

Upon receiving the position registration acknowledgement, the time monitoring unit 15 of the mobile station device 10 extracts the accessible time τ included in the position registration acknowledgement. The time monitoring unit 15 starts the timer to which a value according to the extracted accessible time τ is set (Sa4). Then, the mobile station device 10 enters an idle state (Sa3). The value according to the accessible time τ is a value obtained by subtracting a predetermined value $t_{UE}$ from the accessible time τ. The value $t_{UE}$ is a time sufficient for completing a handover, which satisfies the condition that $τ > t_{UE} ≥ 0$.

Figure 4:
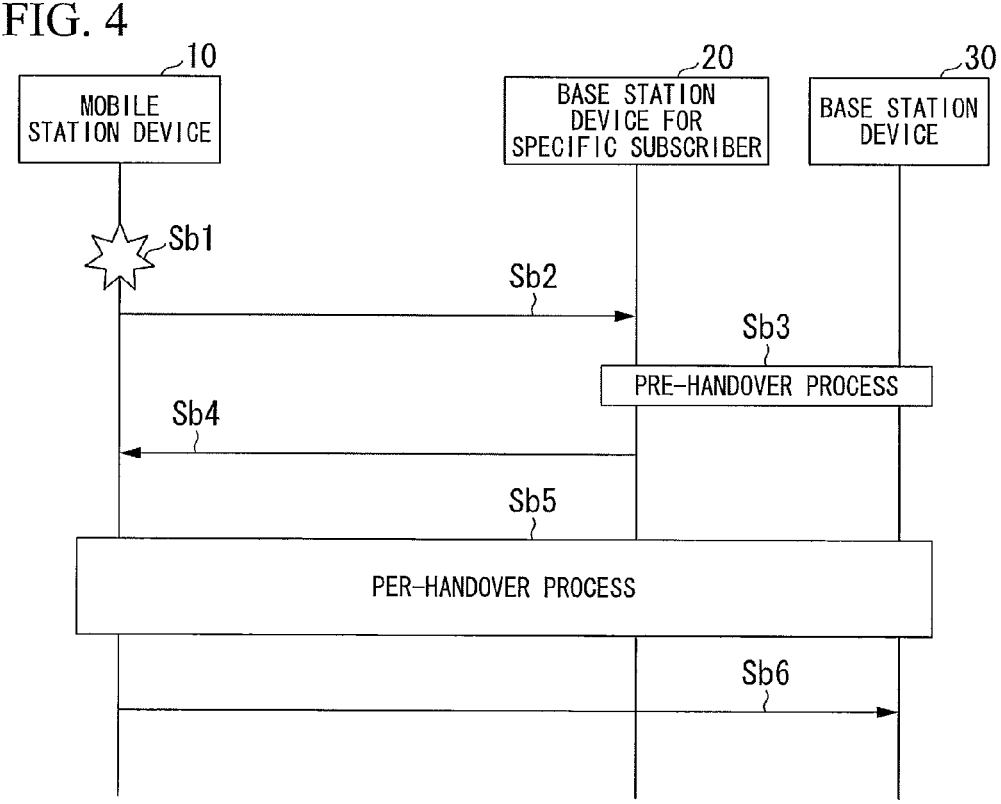
FIG. 4 is a sequence chart illustrating operations at the time of handover according to the first embodiment.

FIG. 4 is a sequence chart illustrating operations at the time of handover according to the first embodiment. When the timer expires after a time $τ-t_{UE}$ elapses from the time the time monitoring unit 15 starts the timer (Sb1), the time monitoring unit 15 reports the expiration of the timer to the handover request notifier 16. Upon receiving the report of the expiration of the timer, the handover request notifier 16 determines a current communication state of the mobile station device 10. If it is determined as a result of the determination that the mobile station device 10 is in communication, the handover request notifier 16 reports a handover request to the base station device 20 for the specific subscriber (Sb2).

Upon receiving the handover request, the pre-handover processor 27 of the base station device 20 for the specific subscriber performs a pre-handover process with the base station device 30 (Sb3). In the pre-handover process, the base station device 20 for the specific subscriber confirms whether or not the mobile station device 10 can handover to and access the base station device 30, such as whether or not there is room for the number of mobile stations that can be served by the base station device 30. If it is confirmed as a result of the pre-handover process that the access is capable, the handover destination notifier 28 transmits, to the mobile station device 10, a handover instruction for specifying a base station device 30 as a handover destination, the handover instruction including information concerning the base station device 30 used for performing a handover (Sb4).

Upon receiving the handover instruction, the handover processor 17 of the mobile station device 10 extracts the information concerning the base station device 30 from the handover instruction. Further, the handover processor 17 performs, using the extracted information, the handover process in which the base station device 30 specified by the handover instruction is regarded as a handover destination (Sb5). The handover process is performed by the handover processor 17 communicating with the handover processor 37 of the base station device 30. When the handover process ends, the handover processor 17 of the mobile station device 10 reports completion of the handover to the base station device 30 (Sb6).

If it is determined in step Sb1 that the mobile communication device 10 is not in communication, as a result of the communication state determination performed by the handover request notifier 16, the mobile station device 10 moves to another base station device 30 from the base station device 20 for the specific subscriber to which the mobile station device 10 is forbidden to access, thereby necessitating no specific operation.

If the mobile station device 10 monitors a peripheral cell when transmitting the handover request in step Sb2, a result of monitoring the peripheral cell may be included in the handover request. In this case, the result of the monitoring can be used when the pre-handover processor 27 of the base station device 20 for the specific subscriber determines a handover destination.

As the handover instruction in step Sb4 and the information concerning the completion of handover in step Sb6, a reconfiguration message used for performing a handover process in an existing system is used as it is. In the case of W-CDMA, for example, a transport channel reconfiguration is used as the handover instruction, and a transport channel reconfiguration complete is used as the information to report completion of handover. Alternatively, a physical channel reconfiguration is used as the handover instruction, and a physical channel reconfiguration complete is used as the information to report completion of handover.

As explained above, the time monitoring unit 15 of the mobile station device 10 detects that the time according to the accessible time τ elapses from the time the position registration is performed. At this time, if the mobile station device 10 is in communication with the base station device 20 for the specific subscriber, the handover request notifier 16 reports a handover request to the base station device 20 for the specific subscriber. Thus, the mobile station device 10 can handover to the base station device 30, thereby preventing disconnection of a call from occurring when the mobile station device 10 is in communication with the base station device 20 for the specific subscriber.

Second Embodiment

Hereinafter, a second embodiment of the present invention is explained with the drawings. In the first embodiment, a handover request, which is a new message not defined by the existing standard, is used to perform handover under the initiative of the mobile station device 10. In the second embodiment, a measurement report, which is defined by the existing standard, is used for performing a handover.

Figure 5:
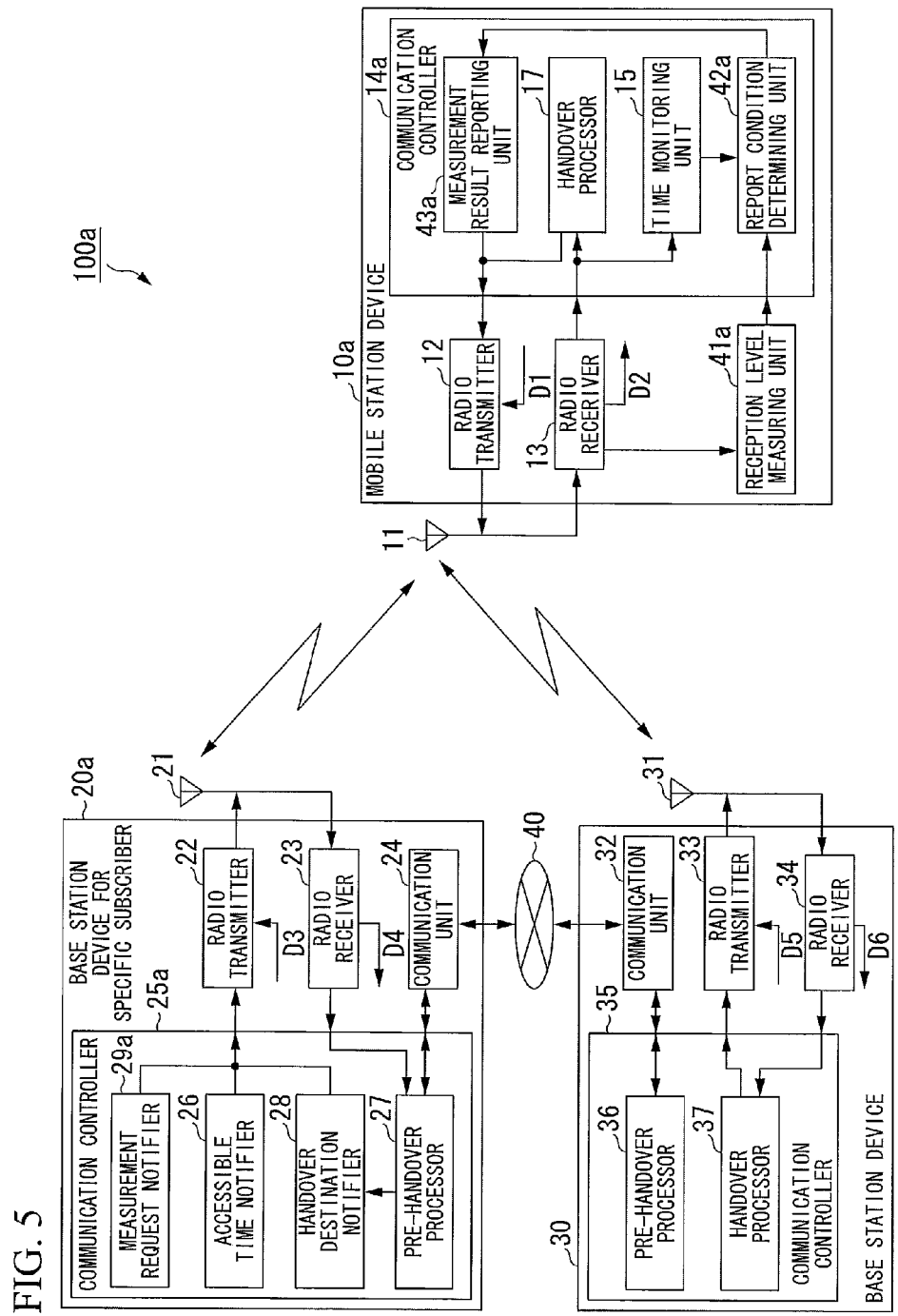
FIG. 5 is a schematic block diagram illustrating a configuration of a mobile communication system 100a according to a second embodiment of the present invention.

FIG. 5 is a schematic block diagram illustrating a configuration of a mobile communication system 100a according to the second embodiment. In FIG. 5, the same reference numerals (11 to 13, 15, 17, 21 to 24, 26 to 28, 30 to 37, and 40) are appended to elements corresponding to those shown in FIG. 2, and explanations thereof are omitted here. The mobile communication system 100a includes: a mobile station device 10a; a base station device 20a for a specific subscriber (first base station device); and the base station device 30. Also in the second embodiment, the cell B served by the base station device 30 overlaps the cell A served by the base station device 20a for the specific subscriber group. The mobile station device 10a is present in the overlapping region.

The mobile station device 10a includes: the antenna 11; the radio transmitter 12; the radio receiver 13; a communication controller 14a; and a reception level measuring unit 41a. The communication controller 14a includes: the time monitoring unit 15; the handover processor 17; a report condition determining unit 42a; and a measurement result reporting unit 43a. The base station device 20a for the specific subscriber includes: the antenna 21; the radio transmitter 22; the radio receiver 23; the communication unit 24; and a communication controller 25a. The communication controller 25a includes: the accessible time notifier 26; the pre-handover processor 27; the pre-handover notifier 28; and a measurement request notifier 29a.

Additionally, the communication unit 24 of the base station device 20a for the specific subscriber and the communication unit 32 of the base station device 30 are connected through the network 40. The network 40 includes, but is not limited to, a network, such as the Internet or a core network of the mobile communication system 100a. Explanations are given here under the assumption that the base station device 20a for the specific subscriber communicates with the base station device 30 through the network 40. However, the configuration is not limited thereto. For example, the base station device 20a for the specific subscriber may wirelessly communicate with the base station device 30 through the respective antennas 21 and 31.

The communication controller 14a and the constituent elements thereof communicate with the base station device 20a for the specific subscriber or the base station device 30 through the radio transmitter 12 or the radio receiver 13. However, descriptions thereof are omitted here. The communication controller 25a and the constituent elements thereof communicate with the mobile station device 10 through the radio transmitter 22 or the radio receiver 23. However, descriptions thereof are omitted here.

The reception level measuring unit 41a measures the reception levels of the signals received by the radio receiver 23, which are transmitted from the base station device 20a for the specific subscriber and the base station device 30. The measurement of the reception levels, particularly the measurement of the reception levels of the signals transmitted from the base station device 20a for the specific subscriber and the base station device 30, are, for example, intra-frequency measurement, inter-frequency measurement, and inter-RAT (Radio Access Technology) measurement in the case of the W-CDMA.

The report condition determining unit 42a determines whether or not a previously-set report condition is met. If it is determined that the report condition is met, the report condition determining unit 42a instructs the measurement result reporting unit 43a to report information indicating the reception levels measured by the reception level measuring unit 41a. Here, the report condition includes at least the condition that the time monitoring unit 15 has detected that the time according to the accessible time τ has elapsed (i.e., the timer has expired). If the condition is met, the report condition determining unit 42a instructs the measurement result reporting unit 43a to report information indicating that the timer has expired.

According to the instruction from the report condition determining unit 42a, the measurement result reporting unit 43a reports, to the base station device 20a for the specific subscriber, the information indicating the reception levels measured by the reception level measuring unit 41a and the information indicating that the time according to the accessible time τ has expired.

In the measurement event defined by the conventional standard, such as for the W-CDMA, the measurement result is reported from the mobile station device only if a report condition is met (i.e., an event is detected), the report condition being such that the reception level of the peripheral cell (corresponding to the base station device 30) exceeds that of the currently-camping cell (corresponding to the base station device 20a for the specific subscriber). However, the reception level of the peripheral cell (corresponding to the base station device 30), and the reception level of the currently-camping cell (corresponding to the base station device 20a for the specific subscriber) do not always meet the report condition at the time of "expiration of the timer." Therefore, the conventional measurement event cannot be used as it is.

For this reason, in the second embodiment, a new measurement event, a report condition of which is such that the timer of the timer monitoring unit 15 expires, is added to the report condition determining unit 42a of the mobile station device 10a. According to the conventional standard, monitoring of a peripheral cell performed by the mobile station device is initiated by an instruction from the base station device. For this reason, to implement the operation, the measurement requirement notifier 29a of the base station device 20a for the specific subscriber reports a measurement request for instructing the mobile station device 10a to set the additional new measurement event thereto, by using system information or measurement control (for example, measurement control in the case of W-CDMA).

Figure 6:
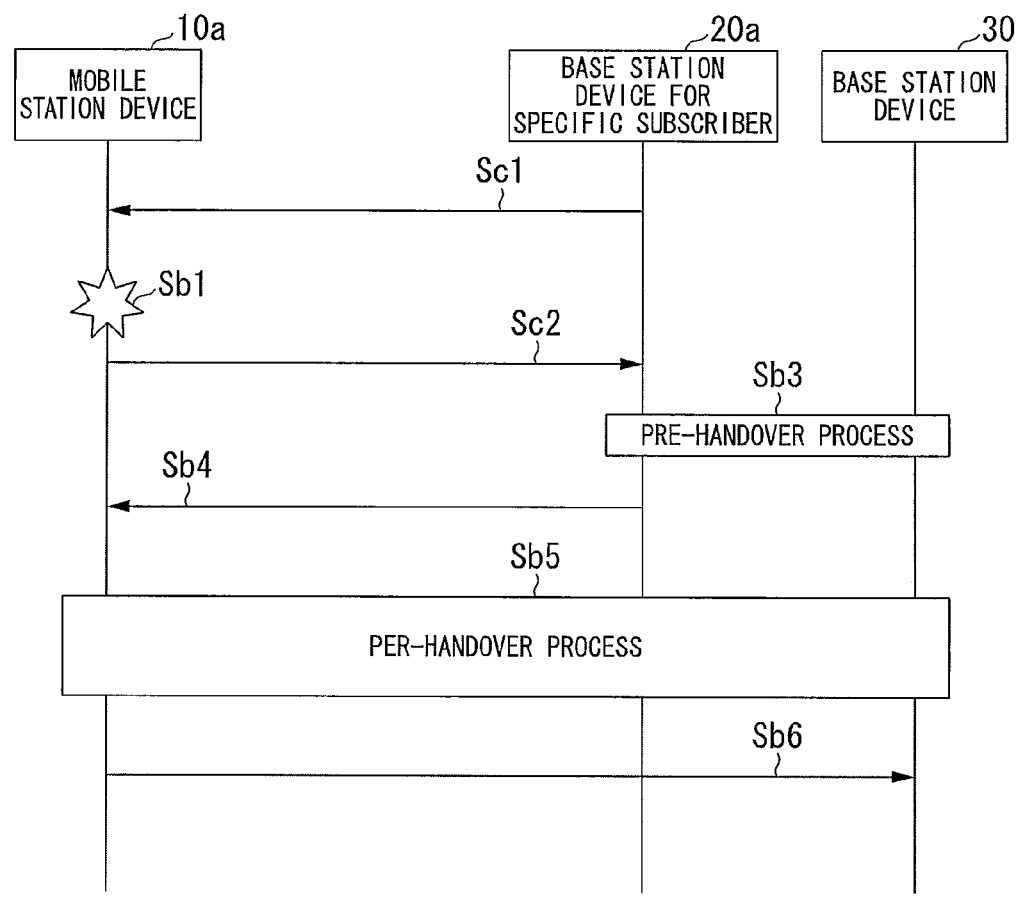
FIG. 6 is a sequence chart illustrating operations at the time of handover according to the second embodiment.

FIG. 6 is a sequence chart illustrating operations at the time of handover according to the second embodiment. In the second embodiment, position registration is performed between the mobile station device 10a and the base station device 20a for the specific subscriber, in a similar manner to the first embodiment. The procedure of the position registration is similar to the sequence shown in FIG. 3, and therefore explanations thereof are omitted here. In FIG. 6, the same reference numerals (Sb1, and Sb3 to Sb6) are appended to the same sequences to those shown in FIG. 4, and detailed explanations thereof are omitted here. Firstly, the measurement request notifier 29a of the base station device 20a for the specific subscriber reports, to the mobile station device 10a, a measurement request (measurement control) for instructing setting of a new measurement event, by using report information such as system information, or measurement control (Sc1).

If the timer of the time monitoring unit 15 expires (Sb1), the report condition determining unit 42a determines that the measurement event that the timer expires occurs, and therefore the report condition is met. Then, the report condition determining unit 42a instructs the measurement result reporting unit 43a to report information indicating the reception levels and information indicating that the time according to the accessible time τ has elapsed. According to the instruction, the measurement result reporting unit 43a reports, to the base station device 20a for the specific subscriber, a measurement result report (measurement report) including the information indicating that the time according to the accessible time τ has elapsed (expiration of event timer) (Sc2). The communication controller 25a of the base station device 20a for the specific subscriber determines whether or not to perform handover, based on whether or not the base station device 20a for the specific subscriber is in communication with the communication device 10a. If it is determined to perform handover, the communication controller 25a determines a handover-destination cell based on the contents of the measurement result report received from the mobile station device 10a.

The communication controller 25a may determine whether or not to perform handover based on the contents of the measurement result report as well as whether or not communication is in process. A method of determining whether or not to perform handover is not defined by the conventional standard. In an actual operation, however, the time a report of occurrence of the measurement event is received from the mobile station device, or the time the contents of a periodic report come to indicate that the reception level of a peripheral cell exceeds that of a cell in communication, is used for determining whether or not to perform handover. Then, the pre-handover processor 27 performs a pre-handover process for performing handover to a base station device in the determined cell (the base station device 30 in this case) (Sb3). Thereafter, the sequences Sb4 to Sb6 are performed in a similar manner as in the case of FIG. 4.

As measurement result reports in the case of the conventional LTE and W-CDMA, two types of an event trigger and a periodic report are defined. Regarding the event trigger, the base station device sets a report condition (such as that the reception level exceeds a threshold) to a mobile station device. The mobile station device with the setting determines that the event occurs, if the result of monitoring a peripheral cell meets the aforementioned report condition. Then, the mobile station device reports the measurement result report to the base station device. Regarding the periodic report, on the other hand, the base station device sets to the mobile station device, the number of times and a period for a report. The mobile station device with the setting periodically reports the measurement result report based on the setting.

It has been explained in the second embodiment that such a new event that the timer has expired is added to the report condition of the event trigger report, and the base station device 20a for the specific subscriber sets the report condition to the mobile station device. Instead of adding the measurement event, however, when the timer expires, the reception levels having been already measured may be reported irrespective of the current reception level. Alternatively, information indicating the reception level may be reported repeatedly. In those cases, when the event that the timer expires occurs, information indicating that the report is made necessary due to the expiration of the timer, or information indicating that the event that the timer expires has occurred, is included in the measurement result report.

In this case, the base station device 20a for the specific subscriber can know the actual reception state based on the measurement result report received from the mobile station device 10a. Thus, if the reception level of a peripheral cell is low and if communication after the handover is to cause interference to the base station device 20a for the specific subscriber, the handover may not be performed.

As explained above, the time monitoring unit 15 of the mobile station device 10a detects that the time according to the accessible time τ elapses from the time the position registration is performed. At this time, if the mobile station device 10a is in communication with the base station device 20a for the specific subscriber, the communication controller 25a of the base station device 20a for the specific subscriber, which receives the result of the detection, causes the mobile station device 10a to handover to the base station device 30, thereby preventing disconnection of a call from occurring when the mobile station device 10a is in communication with the base station device 20a for the specific subscriber.

Third Embodiment

Hereinafter, a third embodiment of the present invention is explained with the drawings. In the second embodiment, the method has been explained, in which the present invention is implemented by adding a new measurement event, that is, by adding new information to the existing message. In the third embodiment, the present invention is implemented without changing the existing message.

Figure 7:
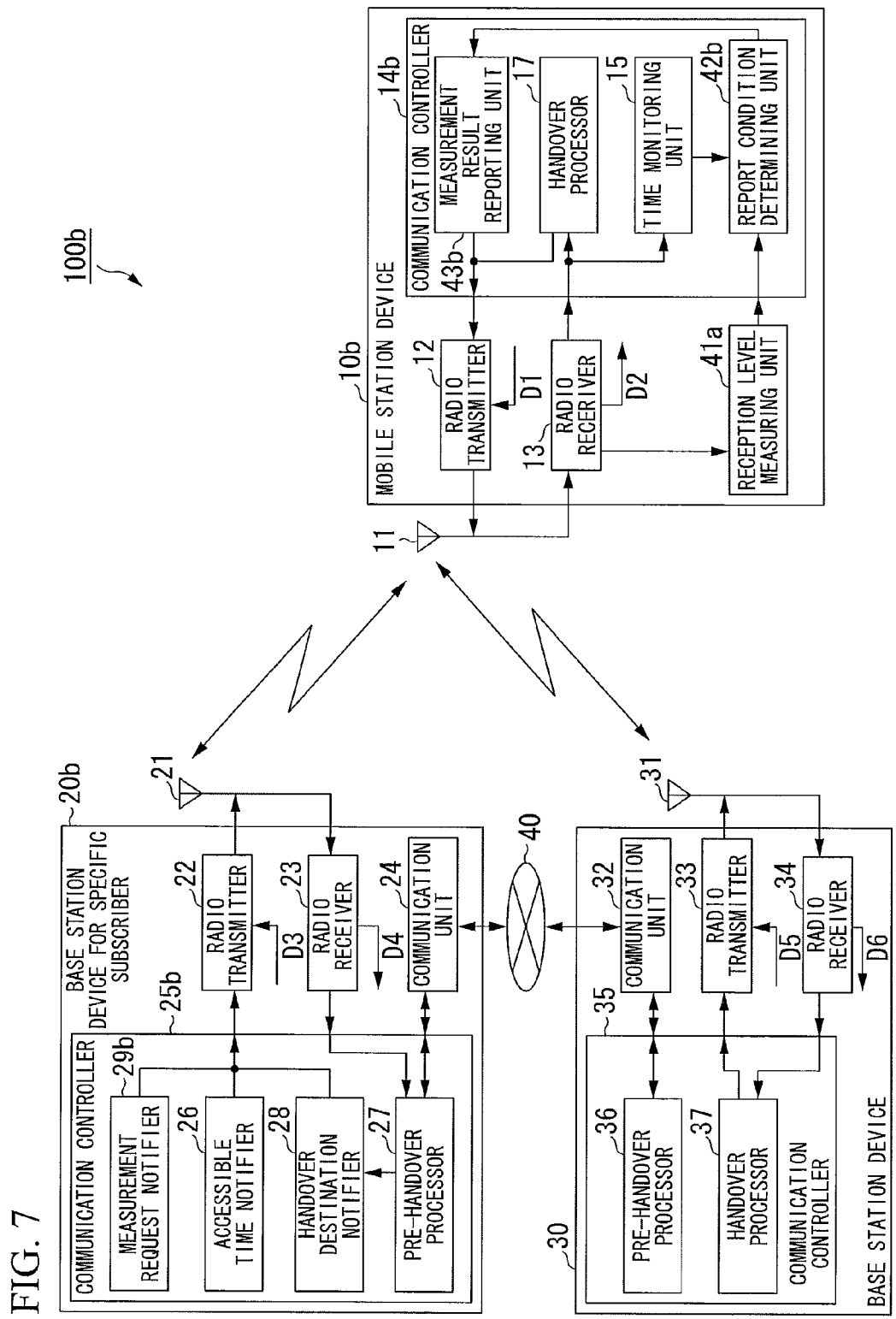
FIG. 7 is a schematic block diagram illustrating a configuration of a mobile communication system 100b according to a third embodiment of the present invention.

FIG. 7 is a schematic block diagram illustrating a configuration of a mobile communication system 100b according to the third embodiment. In FIG. 7, the same reference numerals (11 to 13, 15, 17, 21 to 24, 26 to 28, 30 to 37, 40, and 41a) are appended to elements corresponding to those shown in FIG. 5, and explanations thereof are omitted here. The mobile communication system 100b includes: a mobile station device 10b; a base station device 20b for a specific subscriber (first base station device); and the base station device 30. Also in the third embodiment, the cell B served by the base station device 30 overlaps the cell A served by the base station device 20b for the specific subscriber. The mobile station device 10b is present in the overlapping region.

The mobile station device 10b includes: the antenna 11; the radio transmitter 12; the radio receiver 13; a communication controller 14b; and the reception level measuring unit 41a. The communication controller 14b includes: the time monitoring unit 15; the handover processor 17; a report condition determining unit 42b; and a measurement result reporting unit 43b. The base station device 20b for the specific subscriber includes: the antenna 21; the radio transmitter 22; the radio receiver 23; the communication unit 24; and a communication controller 25b. The communication controller 25b includes: the accessible time notifier 26; the pre-handover processor 27; the pre-handover notifier 28; and the measurement request notifier 29b.

Additionally, the communication unit 24 of the base station device 20b for the specific subscriber and the communication unit 32 of the base station device 30 are connected through the network 40. The network 40 includes, but is not limited to, a network, such as the Internet or a core network of the mobile communication system 100b. Explanations are given here under the assumption that the base station device 20b for the specific subscriber communicates with the base station device 30 through the network 40. However, the configuration is not limited thereto. For example, the base station device 20b for the specific subscriber may wirelessly communicate with the base station device 30 through the respective antennas 21 and 31.

The report condition determining unit 42b determines whether or not a previously-set report condition is met. If it is determined that the report condition is met, the report condition determining unit 42b instructs the measurement result reporting unit 43b to report information indicating the reception levels measured by the reception level measuring unit 41a. Here, the previously-set report condition is, for example, that the reception level of the camping cell which is measured by the reception level measuring unit 41a is equal to or lower than a previously-set determination threshold, and the reception level of a peripheral cell is equal to or higher than a previously-set determination threshold for the peripheral cell. Accordingly, the report condition prior to expiration of the timer can be expressed as the expression (1).

$$Q_a \le T_a \text{ and } Q_M \ge T_M \qquad (1)$$

Here, $Q_a$ denotes the reception level of the camping cell. $T_a$ denotes the previously-set determination threshold. $Q_M$ denotes the reception level of the peripheral cell. $T_M$ denotes the previously-set determination threshold for the peripheral cell.

Further, after the timer expires, that is, after the time monitoring unit 15 detects that a time according to the accessible time τ elapses, the report condition determining unit 42b adds a negative offset to the reception level of the signal transmitted from the base station device 20b for the specific subscriber, which is included in the reception levels measured by the reception level measuring unit 41a. Then, the report condition determining unit 42b determines whether or not the previously-set report condition is met. Additionally, the report condition determining unit 42b adds the negative offset to the reception level to be reported to the measurement result reporting unit 43b.

Accordingly, the report condition posterior to the expiration of the timer can be expressed as the expression (2).

$$Q_a + \text{Offset} \leq T_a \text{ and } Q_M \geq T_M \quad (2)$$

Here, Offset denotes a negative offset (Offset<0). The offset to be used may be reported from the base station device 20*b* for the specific subscriber to the mobile station device 10*b*, or be previously stored by the mobile station device 10*b*. Additionally, the report condition may be a condition that the reception level of the peripheral cell exceeds the reception level of the camping cell, or greatly exceeds a previously-set threshold.

According to the instruction from the report condition determining unit 42*b*, the measurement result reporting unit 43*b* reports, to the base station device 20*b* for the specific subscriber, the information indicating the reception levels measured by the reception level measuring unit 41*a*. Different from the measurement result reporting unit 43*a*, the measurement result reporting unit 43*b* does not report the information indicating that the time according to the accessible time τ has expired. Among the information indicating the reception levels to be reported by the measurement result reporting unit 43*b*, the information indicating the reception level of the camping cell is information indicating a value to which the report condition determining unit 42*b* adds the negative offset, after the timer expires.

Upon receiving the measurement result report, the communication controller 25*b* determines whether or not to perform a handover based on the reception level of the cell on which the mobile station device 10*b* currently camps and the reception level of the peripheral cell, if the mobile station device 10*b* is in communication with the base station device 20*b* for the specific subscriber. At this time, the condition for performing the handover is similar to the aforementioned report condition. For this reason, the negative offset is added to the reception level of the camping cell when the timer expires, thereby enabling generation of a state in which handover is easily performed.

The measurement request notifier 29*b* reports a measurement request for instructing the mobile station device 10*b* to set a measurement event thereto, by using system information or measurement control (measurement control in the case of W-CDMA). The measurement event may be an event trigger report or a periodic report. The measurement event is a measurement event similar to one defined by the existing standard, and does not include a new measurement event such as in the second embodiment.

Figure 8:
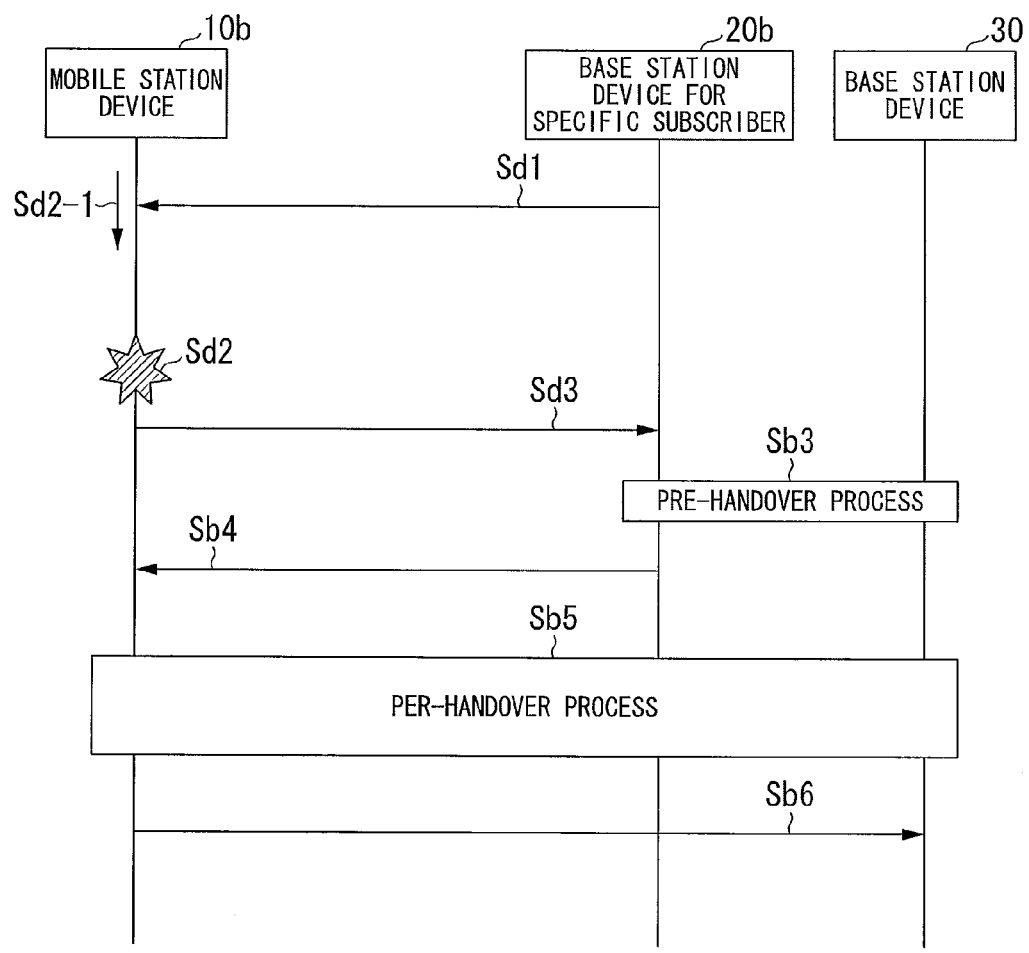
FIG. 8 is a sequence chart illustrating operations at the time of handover according to the third embodiment.

FIG. 8 is a sequence chart illustrating operations at the time of handover according to the third embodiment. In the third embodiment, position registration is performed between the mobile station device 10*b* and the base station device 20*b* for the specific subscriber, in a similar manner to the first embodiment. The procedure of the position registration is similar to the sequence shown in FIG. 3, and therefore explanations thereof are omitted here. In FIG. 8, the same reference numerals (Sb3 to Sb6) are appended to the same sequences to those shown in FIG. 6, and detailed explanations thereof are omitted here.

Firstly, the measurement request notifier 29*b* of the base station device 20*b* for the specific subscriber reports, to the mobile station device 10*a*, a measurement request for instructing the mobile station device 10*a* to set a measurement event thereto, by using report information such as system information, or measurement control (Sd1). Here, the measurement event for instructing the setting may be a periodic report for periodically reporting the measurement results, or an event trigger report for reporting the measurement results when a preciously-set report condition, such as that the reception level of a peripheral cell exceeds that of the camping cell, is met.

The report condition determining unit 42*b* to which the measurement event is set by the measurement request detects that the period for reporting the periodic report has come or determines whether or not the report condition is met (event detection) (Sd2). Then, the report condition determining unit 42*b* instructs the measurement result reporting unit 43*b* to report information indicating the reception levels. At this time, if the timer of the time monitoring unit 15 has already expired (Sd2-1), the report condition determining unit 42*b* adds a negative offset to the reception level of the camping cell. Then, the report condition determining unit 42*b* determines whether or not the report condition is met. Here, the negative offset is also added to the reception level of the camping cell, which the measurement result reporting unit 43*b* is instructed to report. Upon receiving the instruction, the measurement result reporting unit 43*a* reports the measurement result report to the base station device 20*b* for the specific subscriber (Sd3). If the mobile station device 10*b* is in communication with the base station device 20*b* for the specific subscriber, the communication controller 25*b* receiving the measurement result report determines whether or not to perform handover, based on the reception level of the cell on which the mobile station device 10*b* currently camps and the reception level of the peripheral cell. Thereafter, the sequences Sb3 to Sb6 are performed.

Figure 9:
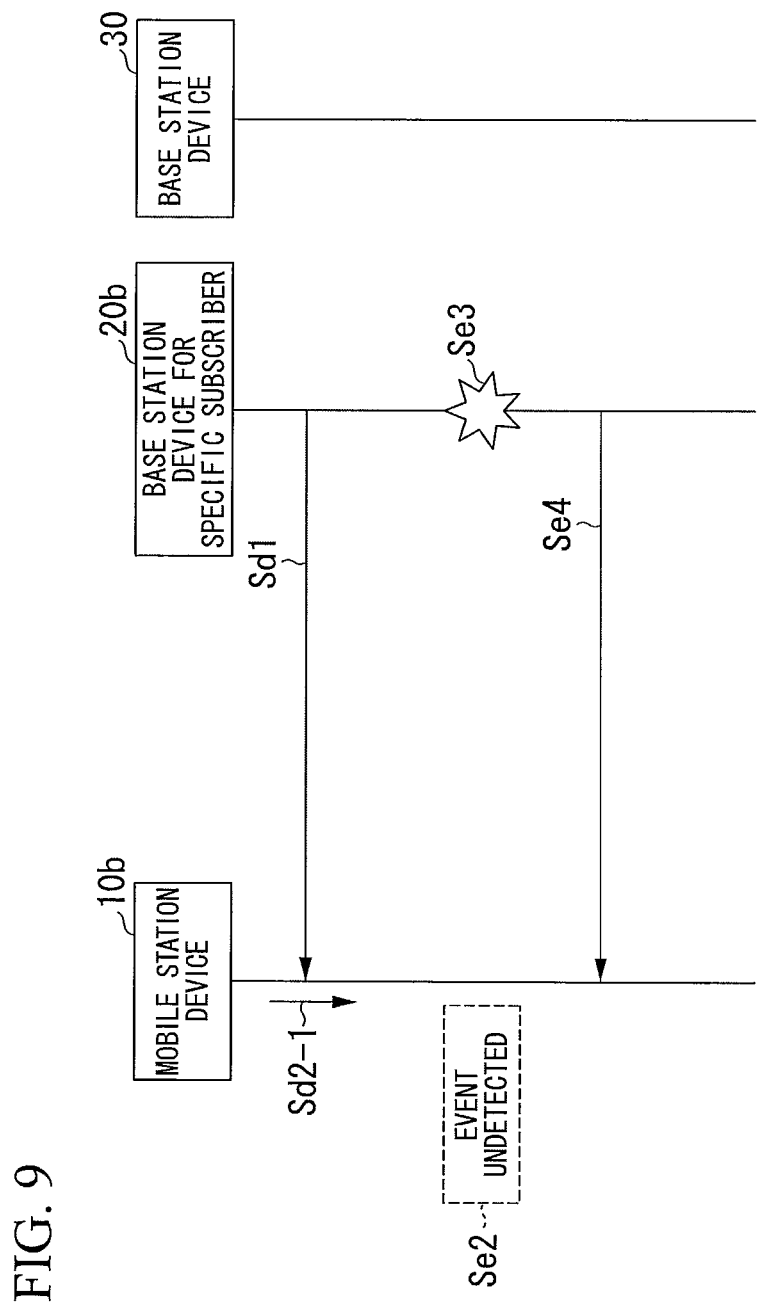
FIG. 9 is a sequence chart illustrating a case in which handover is not performed after a timer expires according to the third embodiment.

FIG. 9 is a sequence chart illustrating a case in which the handover is not performed after the timer expires according to the third embodiment. Similar to the case of FIG. 8, the measurement request notifier 29 of the base station device 20*b* for the specific subscriber reports, to the mobile station device 10*b*, a measurement request for instructing the mobile station device 10*b* to set a measurement event thereto (Sd1). Here, explanations are given under the assumption that the measurement event for instructing the setting is the event trigger report. Then, the report condition determining unit 42*b* determines whether or not the report condition is met, based on the reception levels measured by the reception level measuring unit 41*a*. Here, it is assumed that the report condition is not met although the timer has expired (Sd2-1). Accordingly, the result becomes event non-detection (Se2). Thus, time passes while the state of the event non-detection maintains, the communication controller 25*b* of the base station device 20*b* for the specific subscriber detects that the accessible time τ has elapsed from the time the position registration of the mobile station device 10*b* has been performed, that is, that the accessible time for the mobile station device 10*b* has expired (Se3). If the mobile station device 10*b* is in communication with the base station device 20*b* for the specific subscriber, the communication controller 25*b* reports disconnection of the communication call to the mobile station device 10*b* (Se4).

As explained above, after the time according to the accessible time τ elapses from the time the position registration is performed, the measurement result reporting unit 43*b* adds the negative offset to the reception level of the camping cell and reports the measurement result report. Accordingly, it becomes easier to meet the condition for the communication controller 25*b* of the base station device 20*a* for the specific subscriber to determine whether or not to perform a handover, thereby preventing disconnection of a call from occurring when the mobile station device 10*b* is in communication with the base station device 20*b* for the specific subscriber.

In the third embodiment, it is possible to conform, to the existing standard, the procedure of communication between the mobile station device 10b and the base station device 20b for the specific subscriber, the signals, and the configuration of the base station device 20b for the specific subscriber.

Fourth Embodiment

Hereinafter, a fourth embodiment of the present invention is explained with the drawings. It has been explained in the aforementioned first to third embodiments that handover is performed under the initiative of the mobile station devices 10, 10a, and 10b. In the fourth embodiment, handover is performed under the initiative of a base station device for a specific subscriber.

Figure 10:
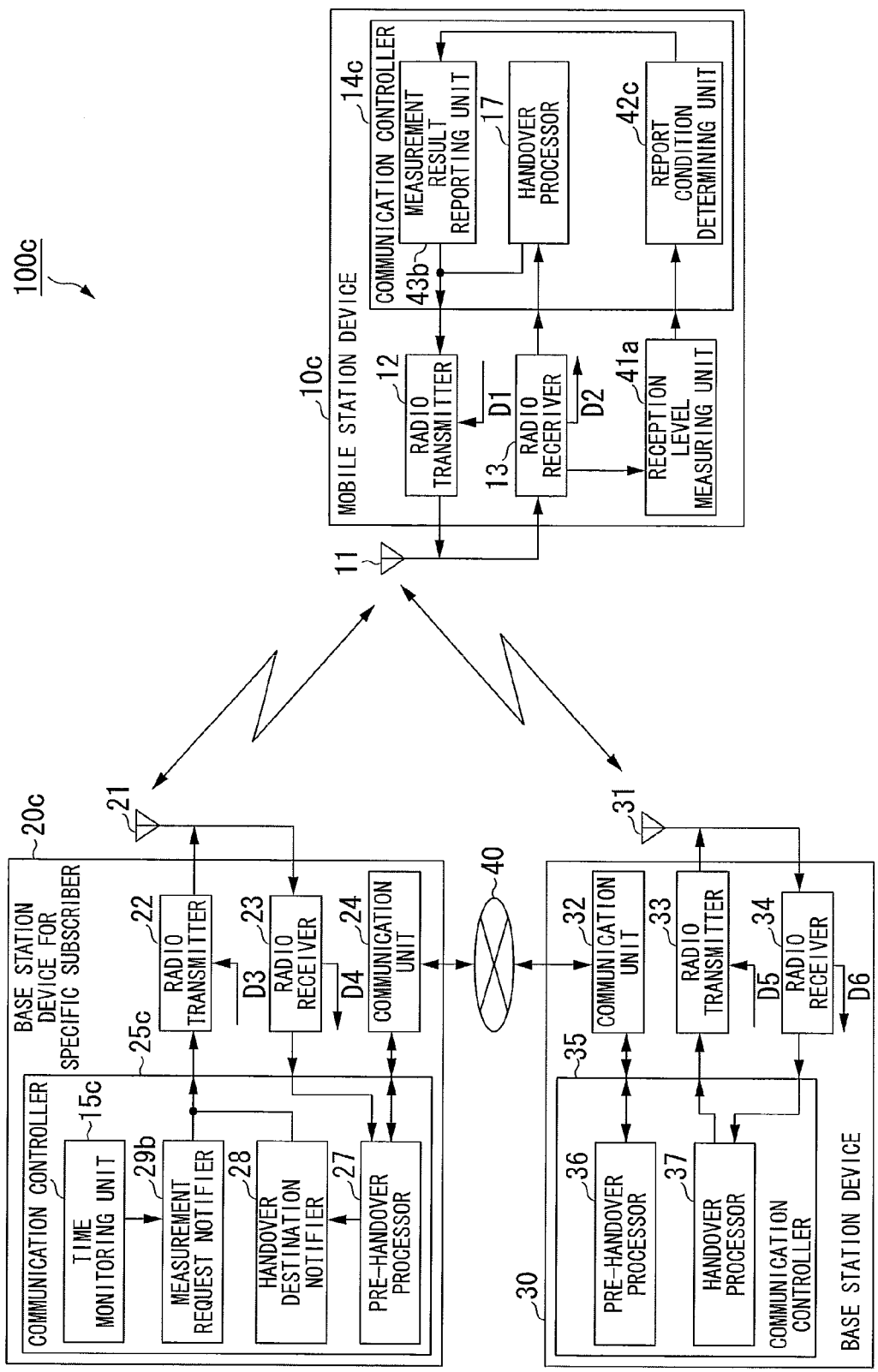
FIG. 10 is a schematic block diagram illustrating a configuration of a mobile communication system 100c according to a fourth embodiment of the present invention.

FIG. 10 is a schematic block diagram illustrating a configuration of a mobile communication system 100c according to the fourth embodiment. In FIG. 10, the same reference numerals (11 to 13, 17, 21 to 24, 27 to 28, 30 to 37, 40, 41a) are appended to elements corresponding to those shown in FIG. 5, and explanations thereof are omitted here. The mobile communication system 100c includes: a mobile station device 10c; a base station device 20c for a specific subscriber (first base station device); and the base station device 30. Also in the fourth embodiment, the cell B served by the base station device 30 overlaps the cell A served by the base station device 20c for the specific subscriber. The mobile station device 10c is present in the overlapping region.

The mobile station device 10c includes: the antenna 11; the radio transmitter 12; the radio receiver 13; a communication controller 14c; and the reception level measuring unit 41a. The communication controller 14c includes: the handover processor 17; a report condition determining unit 42c; and the measurement result reporting unit 43b. The base station device 20c for the specific subscriber includes: the antenna 21; the radio transmitter 22; the radio receiver 23; the communication unit 24; and a communication controller 25c. The communication controller 25c includes: a time monitoring unit 15c; the pre-handover processor 27; the handover destination notifier 28; and a measurement request notifier 29b.

Additionally, the communication unit 24 of the base station device 20c for the specific subscriber and the communication unit 32 of the base station device 30 are connected through the network 40. The network 40 includes, but is not limited to, a network, such as the Internet or a core network of the mobile communication system 100c. Explanations are given here under the assumption that the base station device 20c for the specific subscriber communicates with the base station device 30 through the network 40. However, the configuration is not limited thereto. For example, the base station device 20c for the specific subscriber may wirelessly communicate with the base station device 30 through the respective antennas 21 and 31.

The communication controller 14c and the constituent elements thereof communicate with the base station device 20c for the specific subscriber or the base station device 30 through the radio transmitter 12 or the radio receiver 13. However, descriptions thereof are omitted here. The communication controller 25c and the constituent elements thereof communicate with the mobile station device 10c through the radio transmitter 22 or the radio receiver 23. However, descriptions thereof are omitted here.

The report condition determining unit 42c determines whether or not a previously-set report condition is met. If it is determined that the report condition is met, the report condition determining unit 42c instructs the measurement result reporting unit 43b to report information indicating the reception levels measured by the reception level measuring unit 41a. Here, the report condition is a condition that the reception level of the camping cell which is measured by the reception level measuring unit 41a is equal to or lower than a previously-set determination threshold, and the reception level of a peripheral cell is equal to or higher than a previously-set determination threshold for the peripheral cell. Additionally, the report condition may be a condition that the reception level of the peripheral cell exceeds the reception level of the camping cell or greatly exceeds a previously-set threshold.

The time monitoring unit 15c includes a timer. When registration of position of the mobile station device 10c to the base station device 20c for the specific subscribe is completed, the time monitoring unit 15c sets to the timer, a time according to the predetermined accessible time τ, while associating the time according to the accessible time with the mobile station device 10c. When the timer expires, the time monitoring unit 15c detects that the time according to the accessible time τ elapses from the time the position of the mobile station device 10c is registered to the base station device 20c for the specific subscriber. Here, the time according to the accessible time τ is, for example, a value obtained by subtracting a predetermined value $t_{enb}$ from the accessible time τ. The value $t_{enb}$ is a time sufficient for completing a handover process, and can be freely set as long as satisfying the condition that $τ>t_{enb}>0$. When the timer expires, the time monitoring unit 15c instructs the measurement request notifier 29b to report a measurement request.

Upon receiving the measurement result report, the communication controller 25c determines handover destination candidates for the mobile station device 10c, based on the reception level of the peripheral cell, if the mobile station device 10c is in communication with the base station device 20c for the specific subscriber. When the handover destination candidates are determined, the communication controller 25c instructs the pre-handover processor 27 to perform a pre-handover process.

Figure 11:
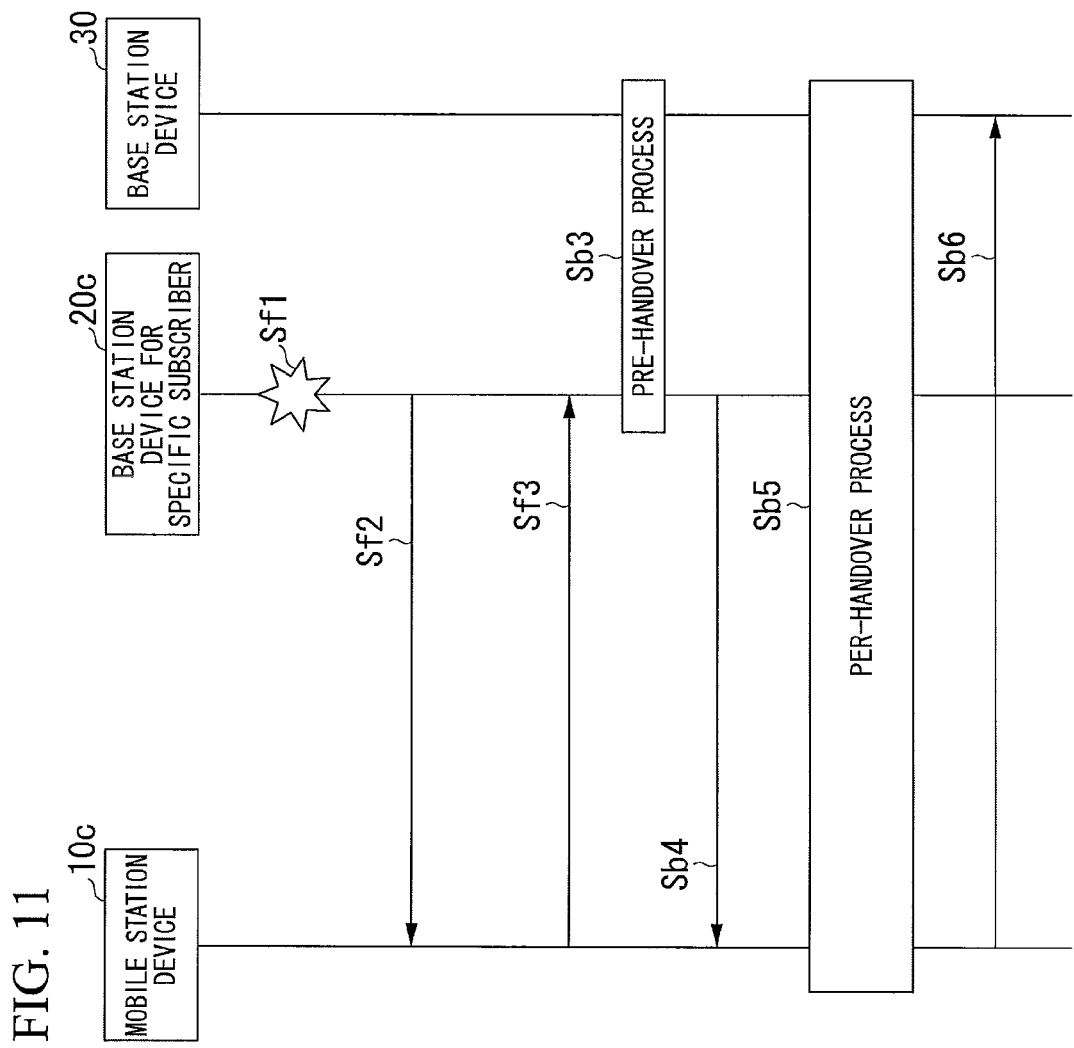
FIG. 11 is a sequence chart illustrating operations at the time of handover according to the fourth embodiment.

FIG. 11 is a sequence chart illustrating operations at the time of handover according to the fourth embodiment. In the fourth embodiment, position registration is performed between the mobile station device 10c and the base station device 20c for the specific subscriber, in a similar manner to the first embodiment. Different from the first to third embodiments, however, the accessible time τ is not reported at the time of the position registration. In FIG. 11, the same reference numerals (Sb3 to Sb6) are appended to the same sequences as those shown in FIG. 6, and detailed explanations thereof are omitted here.

When the time monitoring unit 15c detects that the timer set at the time of the position registration of the mobile station device 10c expires (Sf1), the time monitoring unit 15c instructs the measurement request notifier 29b to report a measurement request. Upon receiving the instruction, the measurement request notifier 29b reports, to the mobile station device 10c, a measurement request (measurement control) for instructing setting of a measurement event (Sf2). The report condition determining unit 42c, to which the measurement event is set by the measurement request, detects that the period for reporting the periodic report has come or determines whether or not the report condition is met. If it is determined that the period for reporting the periodic report has come or that the report condition is met, the report condition determining unit 42c instructs the measurement result reporting unit 43b to report information indicating reception levels measured by the reception level measuring unit 41a.

According to the instruction, the measurement result reporting unit 43b reports, to the base station device 20c for the specific subscriber, the measurement result report (measurement report) including the information indicating the reception levels measured by the reception level measuring unit 41a (Sf3). Upon receiving the measurement result report, the communication controller 25c determines whether or not to perform handover, based on the reception level of the camping cell which is reported by the measurement result report and the reception level of the peripheral cell, if the mobile station device 10c is in communication with the base station device 20c for the specific subscriber. If it is determined to perform a handover, the communication controller 25c instructs the pre-handover processor 27 to perform the pre-handover process. Thereafter, the sequences Sb3 to Sb6 are performed.

In the fourth embodiment, the sequences Sf2 and Sf3 are performed after the timer expires in the sequence Sf1. However, when the timer expires, the communication controller 25c may determine whether or not to perform a handover. Then, if it is determined to perform the handover, the communication controller 25c may instruct the pre-handover processor 27 to perform the pre-handover process.

As explained above, after the time according to the accessible time τ elapses from the time the position registration is performed, it becomes easier to meet the condition for the communication controller 25c of the base station device 20c for the specific subscriber to determine whether or not to perform a handover, thereby preventing disconnection of a call from occurring when the mobile station device 10c is in communication with the base station device 20c for the specific subscriber.

A computer readable recording medium may record a program for implementing functions of: the communication controller 14, the communication controller 25, and the communication controller 35, which are shown in FIG. 2; the communication controller 14a, the communication controller 25a, and the communication controller 35, which are shown in FIG. 5; the communication controller 14b, the communication controller 25b, and the communication controller 35, which are shown in FIG. 7; and the communication controller 14c, the communication controller 25c, and the communication controller 35, which are shown in FIG. 10. Then, processes for the respective units may be performed by a computer system reading and executing the program recorded in the recording medium. The "computer system" includes OS and hardware, such as a peripheral device.

Additionally, the "computer readable recording medium" includes a portable medium such as a flexible disc, a magneto-optical disc, a ROM, or a CD-ROM, and a storage device such as a hard disk built in the computer system. The "computer readable recording medium" may include a medium that dynamically stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Additionally, the program may be a program for implementing part of the aforementioned functions. Further, the program may be a program that can implement the aforementioned functions in combination with a program already recorded on the computer system.

Although the embodiments of the present invention have been explained in detail with reference to the drawings, specific configurations are not limited thereto, and design modification may be made without departing from the scope of the present invention.

INDUSTRIAL APPLICABILITY

The present invention is suitable to be used for a mobile communication system, such as a cellular telephone, but is not limited thereto.

DESCRIPTION OF REFERENCE NUMERALS 10, 10a, 10b, and 10c: mobile station device
11: antenna
12: radio transmitter
13: radio receiver
14, 14a, 14b, and 14c: communication controller
15 and 15c: time monitoring unit
16: handover request notifier
17: handover processor
20, 20a, 20b, and 20c: base station device for specific subscriber
21: antenna
22: radio transmitter
23: radio receiver
24: communication unit
25, 25a, 25b, and 25c: communication controller
26: accessible time notifier
27: pre-handover processor
28: handover destination notifier
29a and 29b: measurement request notifier
30: base station device
31: antenna
32: communication unit
33: radio transmitter
34: radio receiver
35: communication controller
36: pre-handover processor
37: handover processor
40: network
41a: reception level measuring unit
42a, 42b, and 42c: report condition determining unit
43a and 43b: measurement result reporting unit
100, 100a, 100b, and 100c: mobile communication system

The invention claimed is:

1. A mobile communication system comprising:
a mobile station device;
a first base station device to which an accessible time is set; and
a second base station device,
wherein one of the mobile station device and the first base station device comprises:
a time detector configured to detect that a first time elapses from the time the mobile station device performs position registration to the first base station device, the first time being obtained by subtracting a second time sufficient to complete a handover from the accessible time so as to complete handover before the accessible time expires and prevents call disconnection; and
a communication controller configured to, in a case that the time detector detects that the first time elapses from the time the mobile station device performs the position registration to the first base station device, determine, before the accessible time expires, whether or not the mobile station device is in communication with the first base station device, and
in a case that the time detector detects that the first time elapses from the time the mobile station device performs the position registration to the first base station device, and the communication controller determines that the mobile station device is in communication with the first base station device, the mobile communication system performs, before the accessible time expires, a handover to switch a communication connection between the mobile station device and the first base station device to a communication connection between the mobile station device and the second base station device.

2. The mobile communication system according to claim 1, wherein
the first base station device further comprises:
an accessible time notifier configured to report the accessible time to the mobile station device when the mobile station device performs the position registration to the first base station device, and
the mobile station device comprises the time detector.

3. The mobile communication system according to claim 2, wherein the mobile station device comprises:
a handover request notifier configured to report, before the accessible time expires, a handover request to the first base station device in a case that the time detector detects that the first time elapses and the communication controller determines that the mobile station device is in communication with the first base station device.

4. The mobile communication system according to claim 2, wherein the mobile station device comprises:
a reception level measuring unit configured to measure reception levels of signals transmitted from respective base station devices including the first base station device and the second base station device; and
a measurement result reporting unit configured to report, to the first base station device, information indicating the reception levels measured by the reception level measuring unit, the measurement result reporting unit being configured to report to the first base station device, based on detection performed by the time detector, information indicating that the first time elapses.

5. The mobile communication system according to claim 2, wherein the mobile station device comprises:
a reception level measuring unit configured to measure reception levels of signals transmitted from respective base station devices including the first base station device and the second base station device; and
a measurement result reporting unit configured to report, to the first base station device, information indicating the reception levels measured by the reception level measuring unit, the measurement result reporting unit being configured to add a negative offset to one of the reception levels which is associated with the first base station device and to report the information, in a case that the time detector detects that the first time elapses.

6. The mobile communication system according to claim 1, wherein the first base station device comprises the time detector.

7. A base station device comprising:
an accessible time notifier configured to report an accessible time set to the base station device, to a mobile station device when the mobile station device performs position registration to the base station device; and
a communication controller configured to, in a case that the mobile station device detects that a first time elapses from the time the mobile station device performs the position registration to the base station device, the first time being obtained by subtracting a second time sufficient to complete a handover from the accessible time so as to complete handover before the accessible time expires and prevents call disconnection, determine, before the accessible time expires, whether or not the mobile station device is in communication with the base station device,
wherein in a case that the mobile station device detects that the first time elapses from the time the mobile station device performs the position registration to the base station device, and the communication controller determines that the mobile station device is in communication with the base station device, the base station device performs, before the accessible time expires, a handover to switch a communication connection between the mobile station device and the base station device to a communication connection between the mobile station device and another base station device.

8. A base station device comprising:
a time detector configured to detect that a first time elapses from the time the mobile station device performs position registration to the base station device, the first time being obtained by subtracting a second time sufficient to complete a handover from an accessible time set to the base station device so as to complete handover before the accessible time expires and prevents call disconnection; and
a communication controller configured to, in a case that the time detector detects that the first time elapses from the time the mobile station device performs the position registration to the base station device, determine, before the accessible time expires, whether or not the mobile station device is in communication with the base station device,
wherein in a case that the time detector detects that the first time elapses from the time the mobile station device performs the position registration to the base station device, and the communication controller determines that the mobile station device is in communication with the base station device, the base station device performs, before the accessible time expires, a handover to switch a communication connection between the mobile station device and the base station device to a communication connection between the mobile station device and another base station device.

9. A mobile station device comprising:
a time detector configured to detect that a first time elapses from the time the mobile station device performs position registration to a first base station device, the first time being obtained by subtracting a second time sufficient to complete a handover from an accessible time reported from the first base station device so as to complete handover before the accessible time expires and prevents call disconnection; and
a communication controller configured to, in a case that the time detector detects that the first time elapses from the time the mobile station device performs the position registration to the first base station device, determine, before the accessible time expires, whether or not the mobile station device is in communication with the first base station device,
wherein in a case that the time detector detects that the first time elapses from the time the mobile station device performs the position registration to the first base station device, and the communication controller determines that the mobile station device is in communication with the first base station device, the mobile station device performs, before the accessible time expires, a handover to switch a communication connection between the mobile station device and the first base station device to a communication connection between the mobile station device and a second base station device.

10. A mobile station device comprising:
a receiver configured to receive an accessible time reported from a first base station device when the mobile station device performs position registration to the first base station device; and
a communication controller configured to, in a case that the first base station device detects that a first time elapses from the time the mobile station device performs the position registration to the first base station device, the first time being obtained by subtracting a second time sufficient to complete a handover from the accessible time so as to complete handover before the accessible time expires and prevents call disconnection, determine, before the accessible time expires, whether or not the mobile station device is in communication with the base station device, wherein in a case that the first base station device detects that the first time elapses and the mobile station device is in communication with the first base station device, the mobile station device performs a handover to switch a communication connection between the mobile station device and the first base station device to a communication connection between the mobile station device and a second base station device.

11. A handover method for a mobile station device, the handover method comprising:
 detecting that a first time elapses from the time the mobile station device performs position registration to a first base station device, the first time being obtained by subtracting a second time sufficient to complete a handover from an accessible time reported from the first base station device so as to complete handover before the accessible time expires and prevents call disconnection;
in a case that it is detected that the first time elapses from the time the mobile station device performs the position registration to the first base station device, determining, before the accessible time expires, whether or not the mobile station device is in communication with the first base station device; and
 in a case that it is detected that the first time elapses from the time the mobile station device performs the position registration to the first base station device, and the mobile station device is in communication with the first base station device, performing, before the accessible time expires, a handover to switch a communication connection between the mobile station device and the first base station device to a communication connection between the mobile station device and a second base station device.

* * * * *